United States Patent
Paasonen et al.

[11] Patent Number: 5,958,533
[45] Date of Patent: *Sep. 28, 1999

[54] COVERED ROLL AND A METHOD FOR MAKING THE SAME

[75] Inventors: Jan Anders Paasonen, Kerava; Seppo Antti Yliselä, Järvenpää, both of Finland

[73] Assignee: Stowe Woodward Company, Middletown, Va.

[*] Notice: This patent is subject to a terminal disclaimer.

[21] Appl. No.: 08/697,438

[22] Filed: Aug. 23, 1996

Related U.S. Application Data

[63] Continuation-in-part of application No. 08/418,421, Apr. 6, 1995, Pat. No. 5,601,920.

[51] Int. Cl.⁶ .................................................. B32B 9/00
[52] U.S. Cl. .................. 428/36.5; 428/36.91; 428/68; 428/71; 428/76; 428/155; 428/372; 428/377; 428/382; 428/383; 428/390; 428/425.8; 427/195; 427/318; 427/358; 264/46.9; 264/225
[58] Field of Search .............................. 428/71, 68, 155, 428/76, 375, 377, 382, 372, 383, 390, 425.8, 461, 366, 358, 141, 36.5, 36.91, 35.9; 427/195, 318, 358; 264/225, 46.9

[56] References Cited

U.S. PATENT DOCUMENTS 5,601,920   2/1997   Paajonen et al. .................. 428/375

*Primary Examiner*—Ellis Robinson
*Assistant Examiner*—Abraham Bahta
*Attorney, Agent, or Firm*—Myers Bigel Sibley & Sajovec, PA

[57] ABSTRACT

The problems caused by chemical and thermal shrinkage of hard roll covers, are reduced by the inclusion of one or more intermediate compressive layers between the metal roll substrate and the outer cover, or cover. A compressive layer has the properties of being rigid enough to allow the cover to be applied to the roll, and compressible enough to deform and absorb the stresses which occur as the cover is shrinking during processing.

In one embodiment, the intermediate compressive layer comprises a three dimensional fabric that is filled preferably with a thermoset resin system which cures at lower temperature than cover. In a second embodiment, the precise amount of shrinkage in the roll is predetermined to a high enough degree of accuracy so that a depth for the fabric layer can be used to compensate for the amount of shrinkage, thereby eliminating the need for filling. In a third embodiment, the compressive layer is comprised of a meltable material wherein said material melts at cure temperatures. The resulting cavity is then filled with a thermoset resin.

The problems caused by chemical and thermal shrinkage are further reduced through a method based on applying a polymeric cover layer over one or more intermediate compressive layers, curing at an elevated temperature, and, allowing the cover to shrink during curing or hardening.

18 Claims, 10 Drawing Sheets

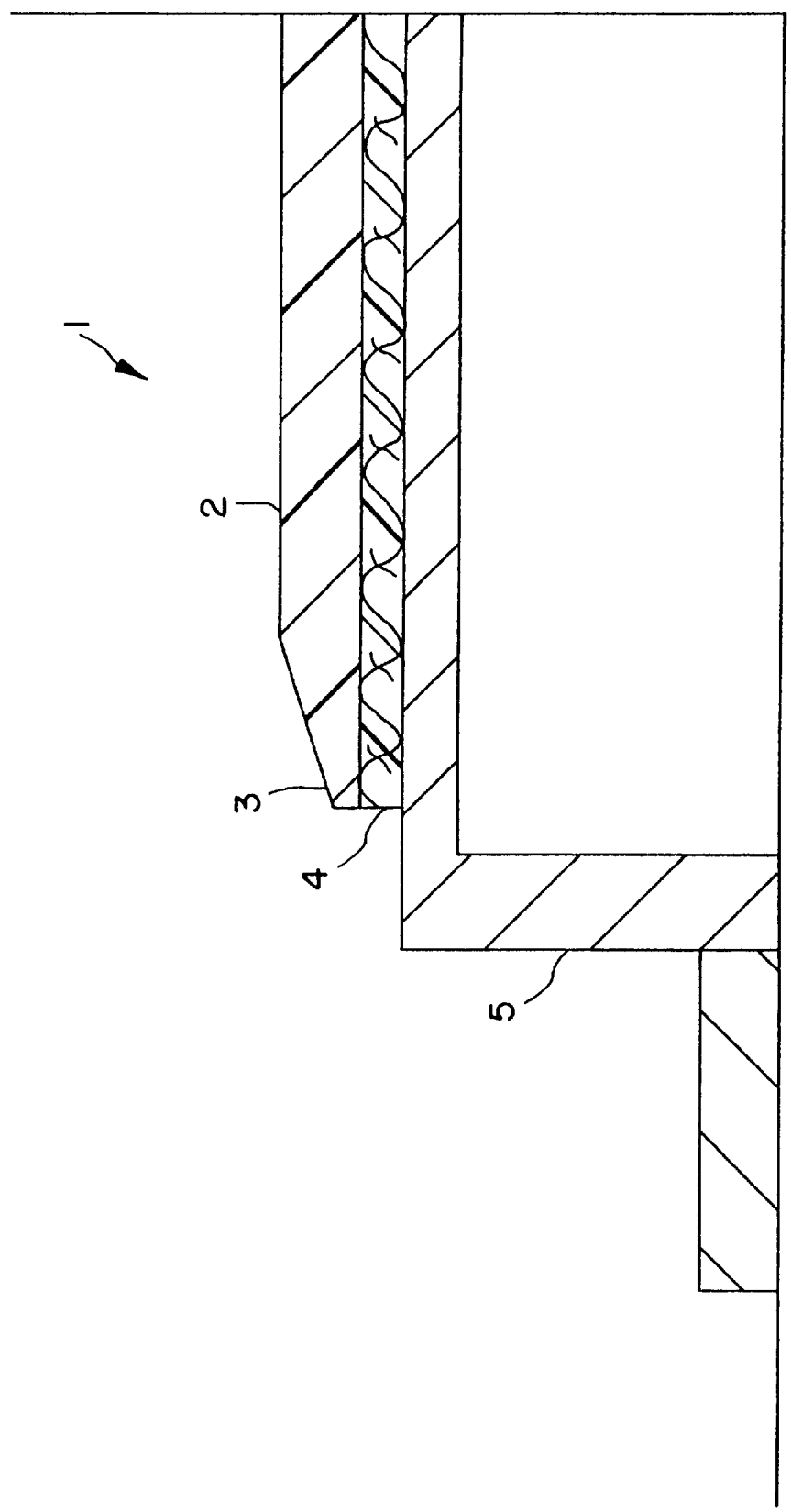

COVERED ROLL AND A METHOD FOR MAKING THE SAME

This application is a continuation-in-part of application Ser. No. 08/418,421 filed on Apr. 6, 1995 now U.S. Pat. No. 5,601,920.

FIELD OF INVENTION

The field of this invention is covered rolls for industrial applications, and more particularly, rolls with relatively hard covers and methods of making such rolls.

BACKGROUND OF THE INVENTION

Covered rolls are used industrially in demanding environments where they are subjected to high dynamic loads and temperatures. For example, in a typical paper mill, large numbers of rolls are used not only for transporting the web sheet which becomes paper, but also for processing the web itself into finished paper. These rolls are precision elements of the system which are precisely balanced with surfaces that must be maintained at specific configurations.

One type of roll that is particularly subjected to high dynamic loads, is a calender roll. Calendering is employed to improve the smoothness, gloss, printability and thickness of the paper. The calendering section of a paper machine, is a section where the rolls themselves contribute to the manufacturing or processing of the paper rather than merely transporting the web through the machine.

In order to function properly, calender rolls must have extremely hard surfaces. For example, typically, the calender rolls are covered with a thermoset resin having a Shore D hardness within the range of 84–95 and an elastic modulus within the range of 1,000–10,000 MPa. Most commonly, epoxy resins are used to cover calender rolls because epoxy resins form extremely hard surfaces. Thermoset resins, such as, epoxy resins with characteristics suitable for forming the surfaces of calender rolls are cured at relatively high temperatures. Currently, such resins are cured at temperatures in the range of 100–150° C.

It is well known that the higher the curing temperature for heat resistant thermoset resin systems, the higher will be the thermal resistance of the resulting cover. Furthermore, present day demands of the paper mill require rolls, particularly calender rolls, with higher thermal resistances. Thus, it would be desirable to produce covers for such rolls which can be cured at 150–200° C. However, prior to the present invention, curing at such high temperatures caused so much stress that the cover tended to crack, rendering it unusable. A discussion of the physical chemistry of such a roll cover can be found in a paper entitled, "The Role Of Composite Roll Covers In Soft And Super Calendering," J. A. Paasonen, presented at the 46ème Congres Annuel Atip, Grenoble Atria World Trade Center Europole, Oct. 20–22, 1993, the teachings of which are incorporated herein by reference.

Indeed, one important challenge to the manufacture of roll covers is to develop roll covers that can withstand the high residual stresses caused during manufacturing. Problems from residual stresses are most significant in the harder (higher stiffness) compounds and often result in cracking, delamination, and edge lifting.

Residual stresses not only promote the undesirable cracking and/or edge lifting tendency of the cover, but they often cause premature local failure or shorter than desired life cycles. This is especially true for high performance, hard polymeric roll coverings where the basic approach has been to tolerate a production level of residual stresses that is still acceptable from a products performance standpoint. Therefore, there is a need to develop methods of roll cover construction that reduce residual stresses in the product.

Consideration of residual stresses is especially critical during the manufacture of the roll cover. In particular, heating and curing processes must be given careful consideration as these conditions are the most significant factors in the development of such stresses. Residual stresses develop in polymer based covers as a result of the mismatch in thermal shrinkage properties between and/or among the cover materials and the core materials and from chemical shrinkage. Polymers, the material of the cover, typically have a coefficient of thermal expansion that is an order of magnitude greater than that of steel, the material of the core.

A suggestion to alleviate stresses caused by processing covered rolls is to produce a cover as a finished product and bond the fully cured cover to a core structure. This can be accomplished by wrapping a cover (topstock) over a mold, demolding and bonding the cover to a core structure at a lower temperature level than the cover cure temperature, or by casting the cover separately and bonding it to a metal core at a lower temperature than the casting temperature. Thus, the thermal stresses that would arise between the cover and the core from cooling down the cover from the cure temperature would be reduced. Although, adhesives are available, some adhesives exhibit poor bonding strengths when the roll is subjected to industrial applications. In general, adhesives that cure at high temperatures are required for high temperature performance. However, subjecting the core to high temperature bonding conditions results in those stresses that were avoided by separately producing the cover.

In addition, manufacturing costs would be raised by the necessity of having to produce the cover first as a separate cylindrical structure, and then, fitting it over a roll core at a lower processing temperature than was required for processing the cover. These casting methods require that an open cavity be created between the cover and the roll core which necessitate multiple process steps and the use of inner mandrels. Even if the cover is separately manufactured via a centrifugal casting method, additional costs and steps are required for an outer mold.

Another possible solution is to develop a cover material having a thermal shrinkage as close to the metallic core as possible. While composite structures may be developed with the expansion coefficients tailored to match the metal core, such methods are expensive and may not produce the desired thermomechanical response for certain industrial applications. Thus, the need exists to develop methods to reduce the residual stress levels in current production materials.

SUMMARY OF THE INVENTION

The problems caused by chemical and thermal shrinkage of hard roll covers are reduced in accordance with the present invention by the inclusion of at least one intermediate compressive layer between the roll core base and the outer cover, or topstock. This compressive layer is rigid enough to allow the cover to be applied to the roll while being compressible enough to deform and absorb the stresses which occur as the cover is shrinking during processing.

The problems caused by chemical and thermal shrinkage are further reduced in accordance with the present invention through a method, which is based on applying a polymeric cover layer over an intermediate compressive layer, curing at an elevated temperature, and, allowing the cover to shrink during curing or hardening. In one embodiment of the present invention, the compressive layer is filled with a filler material after the cover is fully processed.

Accordingly, it is an object of the present invention to provide a roll with a very hard polymeric cover over a metal roll core.

It is a further object of this invention to provide coverings for industrial rolls which have a high degree of flexibility and high resistance to deformation causing stresses.

Another object of this invention is to provide rolls with hard polymeric coverings for industrial applications that are less expensive to manufacture than existing rolls.

Another object of this invention is to provide coverings for industrial rolls that reduce the transfer of frictional heat from one layer to the next.

Another object of this invention is to provide coverings for industrial rolls that have an extended service life.

Another object of this invention is to provide coverings for industrial rolls that minimize or eliminate rotational slippage between the cover and the roll.

Another object of this invention is to reduce the problems caused by chemical and thermal shrinkage that occur during the manufacture of a covered roll.

Another object of this invention is to reduce the problems caused by residual stresses that occur during the manufacture of the covered roll.

Another object of this invention is to provide an intermediate compressive layer between the metal roll and the outer cover, or topstock, to absorb the stress made by the cover on the metal roll.

It is another object of this invention to provide an intermediate compressive layer that is rigid enough to allow the cover to be applied to the roll while being compressible enough to absorb the stresses which occur as the cover is shrinking during processing.

It is another object of this invention to fill the compressive layer with a filling material after the cover has been fully processed.

It is another object of this invention to provide a covered roll having a multilayered structure of polymers or polymer composites, wherein one or more of the intermediate layers comprises a compressive layer.

Another of object of this invention is to provide an improved covered calender roll and method for making such a roll.

DESCRIPTION OF THE PREFERRED EMBODIMENT

At the outset, the covered roll and process for making the covered roll are described in their broadest overall aspects with a more detailed description following. High performance covered rolls are manufactured with reduced residual stresses through a method of applying a polymeric cover layer over an intermediate compressive layer. The purpose of the intermediate compressive layer is to absorb the thermal shocks and chemical volume changes created during the manufacturing process.

Figure 1:
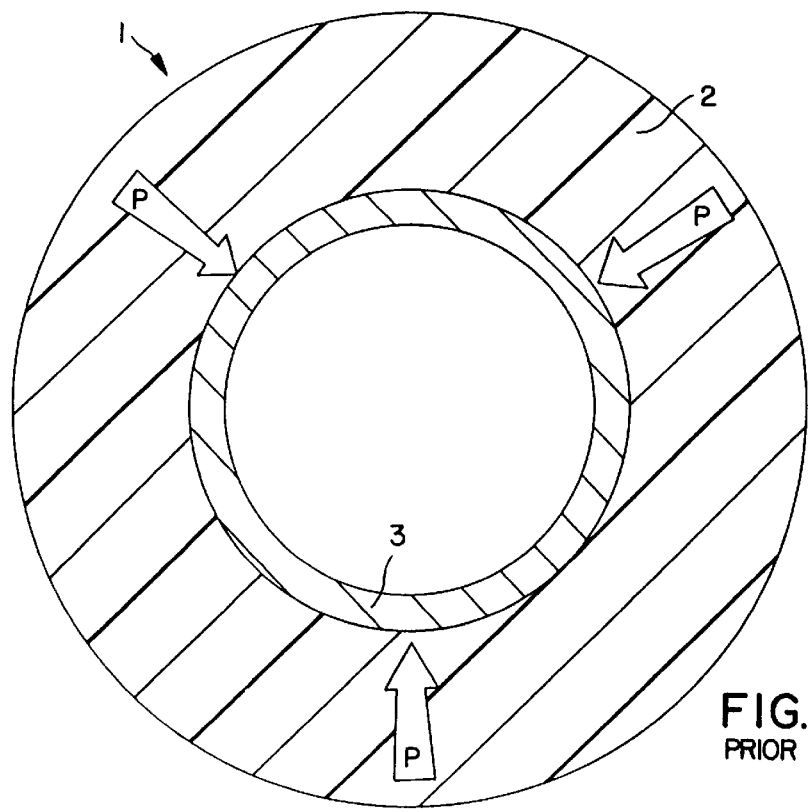
FIG. 1 is a cross sectional view of a prior art roll having a multi-layered covering and which diagrammatically shows the thermal and residual stresses within the cover directed towards the metal roll core.
Figure 2:
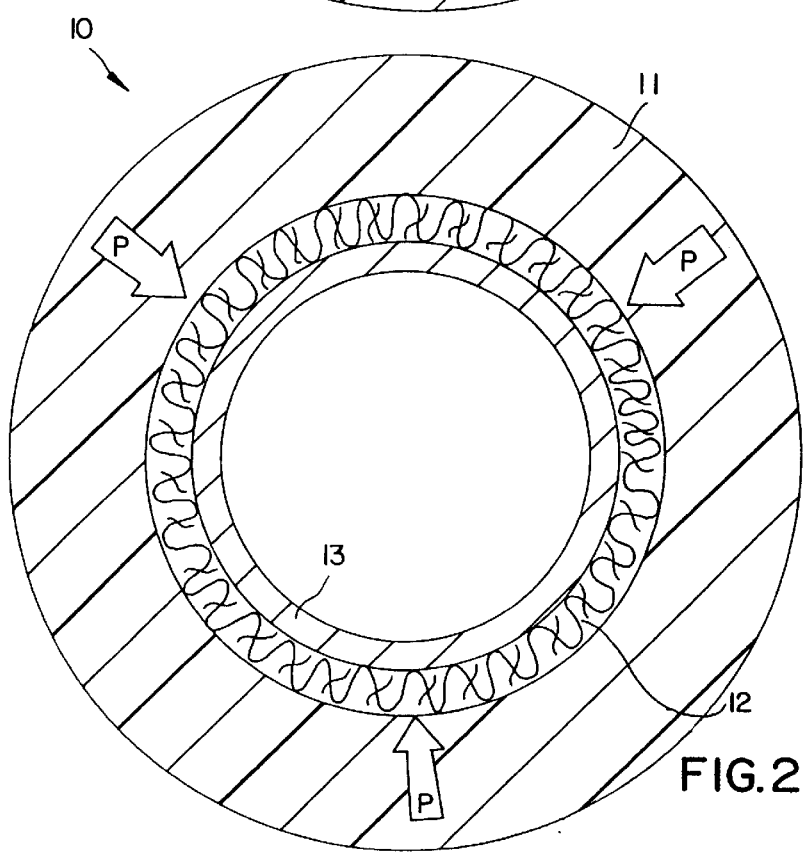
FIG. 2 is a cross-sectional view of the covered roll of the present invention having an intermediate compressive layer and which diagrammatically shows how the thermal and residual stresses within the cover are absorbed by an intermediate compressive layer.

With reference now to the drawing, FIG. 1 shows a covered roll 1 of the prior art. The arrows identified by the letter P in FIG. 1 indicate how the residual stresses and thermal shocks within the cover 2 are directed towards the metal roll core base 3. Although not indicated by arrows in FIG. 1, the residual stresses and thermal shrinkages occur in other directions within the roll as well, such as, axially and radially. Eventually, these internal stresses lead to premature cracking of the roll. FIG. 2 shows an embodiment of the present invention wherein a covered roll 10 has a roll cover 11 applied over an intermediate compressive layer 12 and a metal core base 13. The arrows identified by the letter P in FIG. 2 indicate how the intermediate compressive layer 12 allows the roll cover 11 to shrink in the direction as shown during the hardening and cooling after thermal treatment of this layer. Although not indicated by arrows in FIG. 2, intermediate compressive layer 12 allows for shrinkage and shock absorption in other directions within the roll as well, such as, axially and radially.

Figure 3:
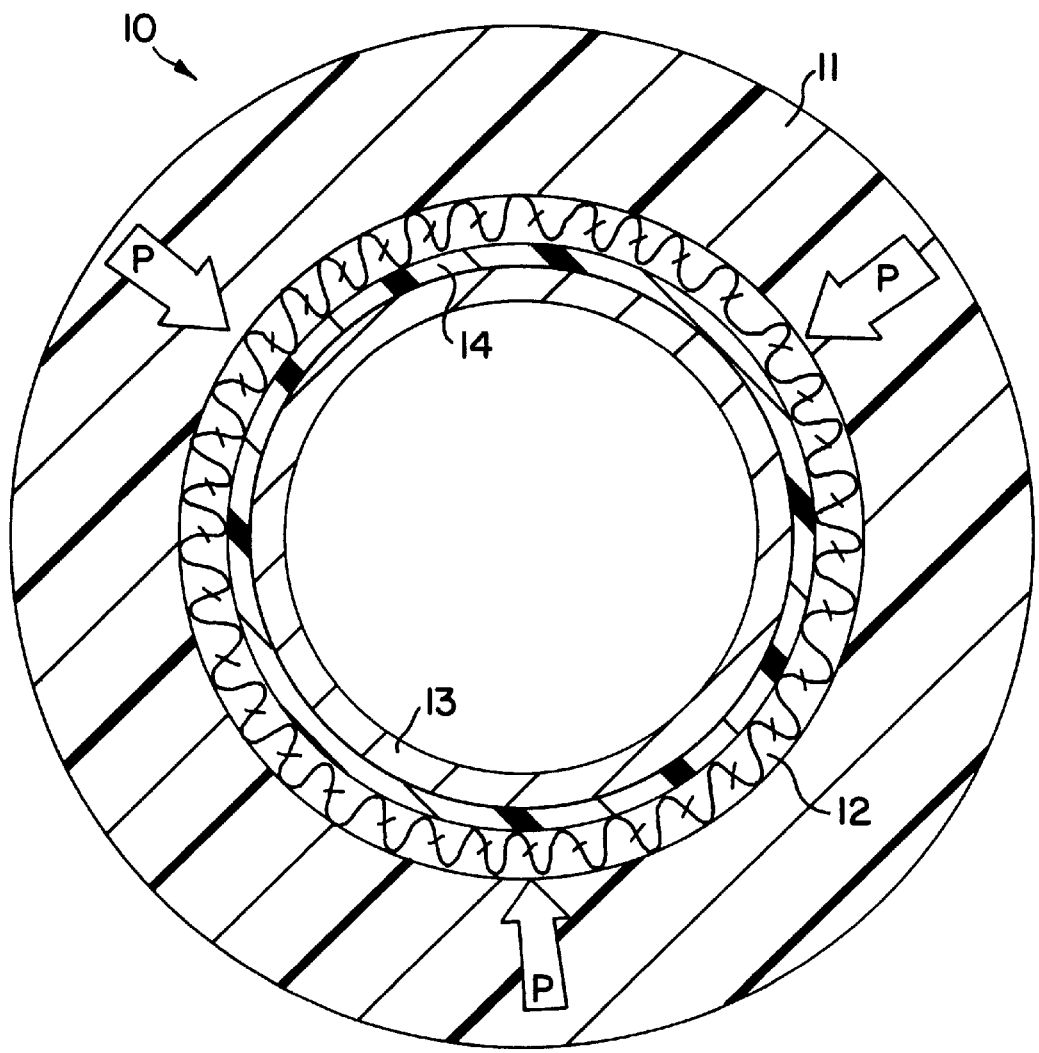
FIG. 3 is a cross-sectional view of the covered roll of the present invention having an intermediate compressive layer applied over a roll core having a base layer, and which diagrammatically shows how the thermal and residual stresses within the cover are absorbed by an intermediate compressive layer.

As will be apparent to one skilled in the art, the compressive layer can be applied to a variety of roll bases in addition to a metal roll core base. Specifically the roll core 13 may have formed around it, a resinous base layer 14 as shown in FIG. 3. Further, it will be readily understood that the metal roll core 13 depicted in FIG. 2 may be replaced by other suitable roll bases, such as, polymeric roll bases or other composite roll bases. However, when the roll base is a metal core, typically it is a conventional metal roll core made of iron or steel.

In one embodiment of the present invention involving a secondary processing phase, the intermediate compressive layer 12 comprises a three dimensional spacer fabric that, in the final stages after cover production, is filled preferably with a thermoset resin forming system, which cures at a lower temperature than the cover 11.

However, the intermediate compressive layer 12 does not have to be filled. In one important embodiment, the precise amount of shrinkage in the roll can be predetermined with enough accuracy, so that, a depth for the intermediate fabric layer can be used to compensate for the amount of this shrinkage, and therefore, eliminate the need for filling.

In yet another important embodiment of the present invention, the intermediate compressive layer is comprised of a wax or other meltable material. Indeed, the wax or other meltable material can be applied to core 13 in the same manner as a resin, i.e., through a nozzle. After a cover is applied over the wax, the wax can be removed by melting, and the resulting gap-layer filled utilizing conventional pressure casting methods.

In manufacturing a roll in accordance with the one important embodiment and with further reference to FIG. 2, a compressive layer 12 is applied to a metallic roll 13. Thereafter, a covering material 11 is placed over the compressive layer, and the covering material is fully cured. During the curing process, the residual stresses are absorbed by the compressive layer 12 and do not result in the roll cracking. After the cover 11 has been allowed to cure, the compressive layer 12 is filled with a polymer that cures at a lower temperature than the cover 11, thus providing strength to the roll 10 and reducing the likelihood of roll cover 11 cracking.

Figure 4:
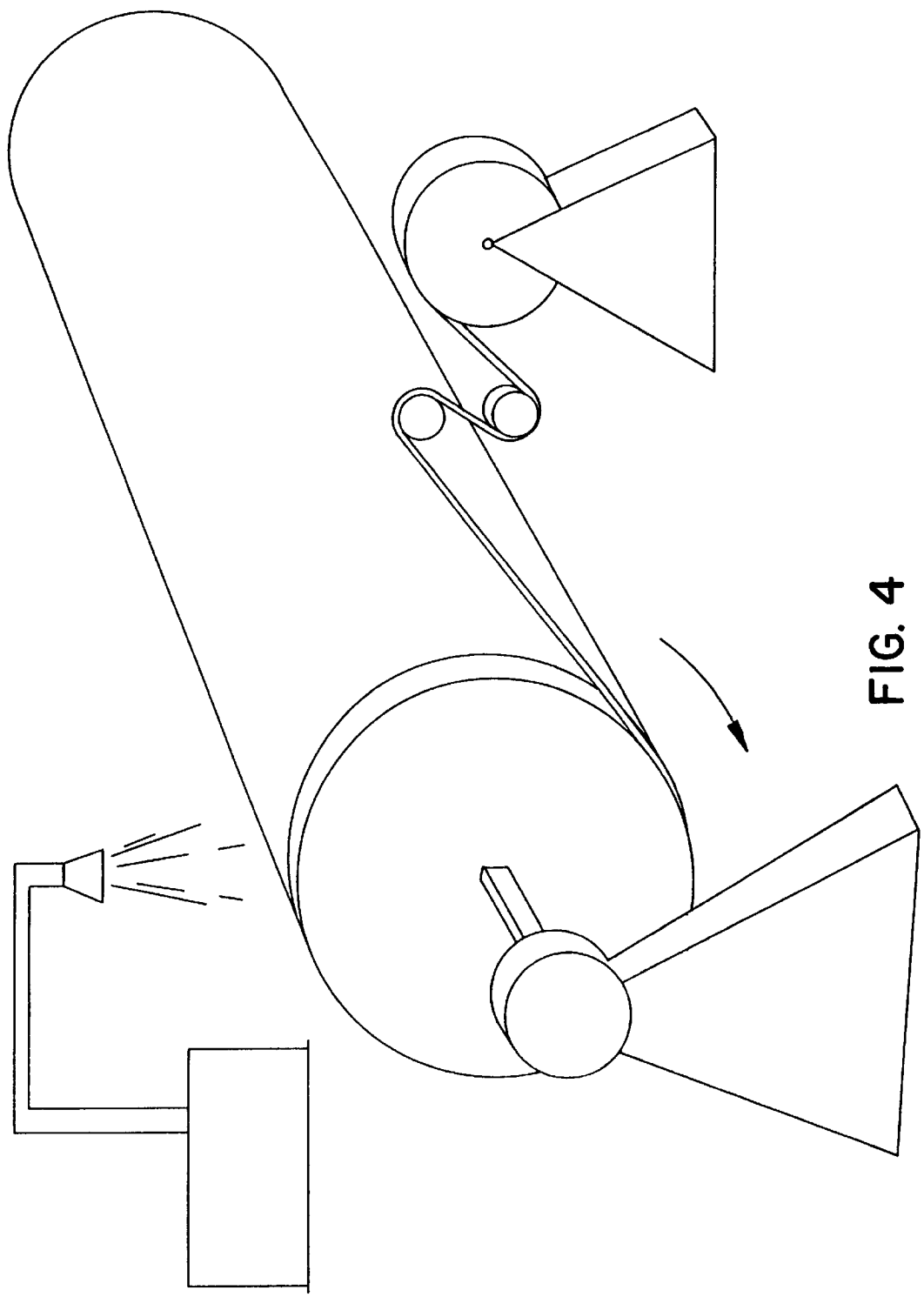
FIG. 4 is a perspective view of the manufacturing process in accordance with the present invention in which a cover is applied as a layered resin impregnated fabric.
Figure 5:
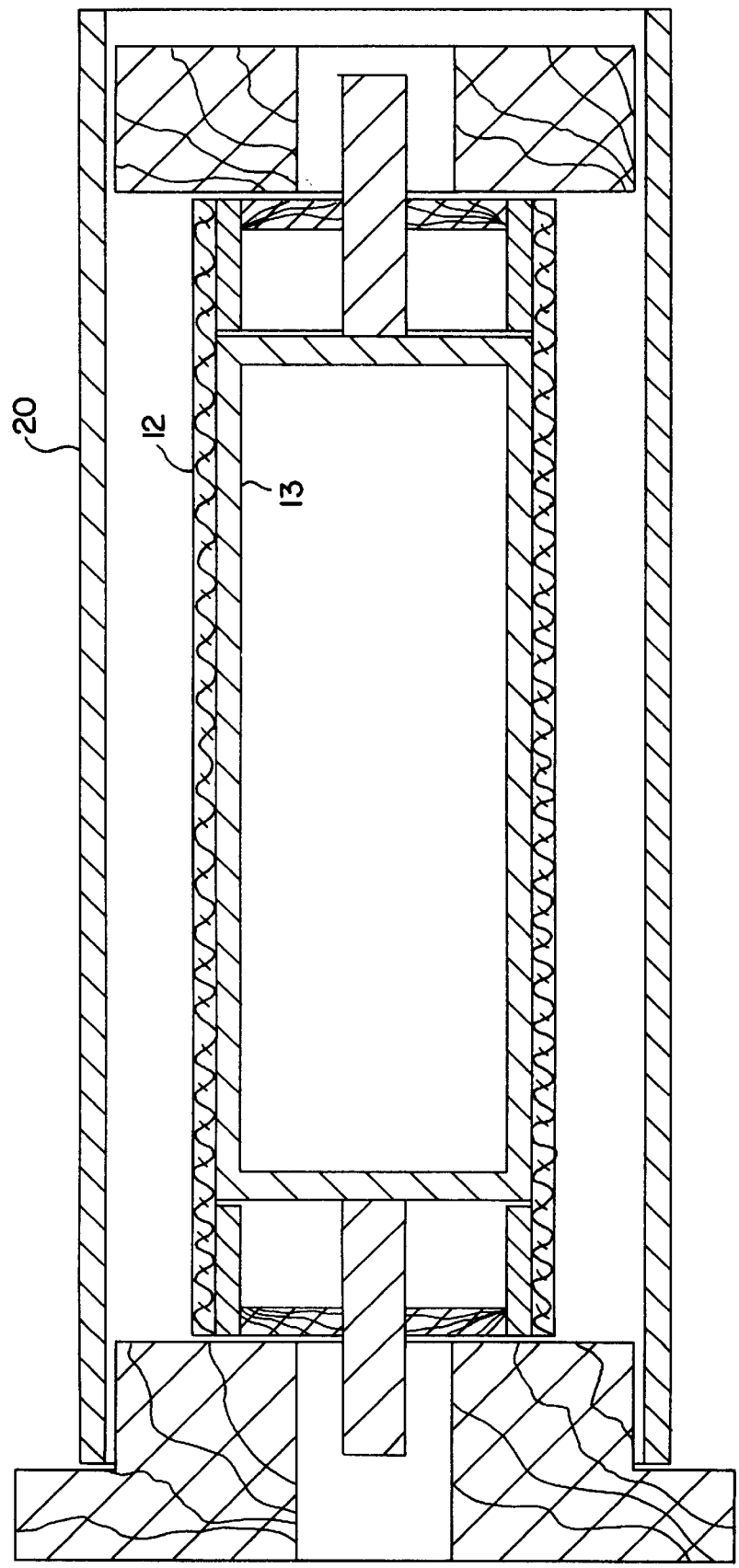
FIG. 5 is a sectional view of the manufacturing process in accordance with the present invention in which a cover is cast in a metal outer mold assembly.
Figure 6:
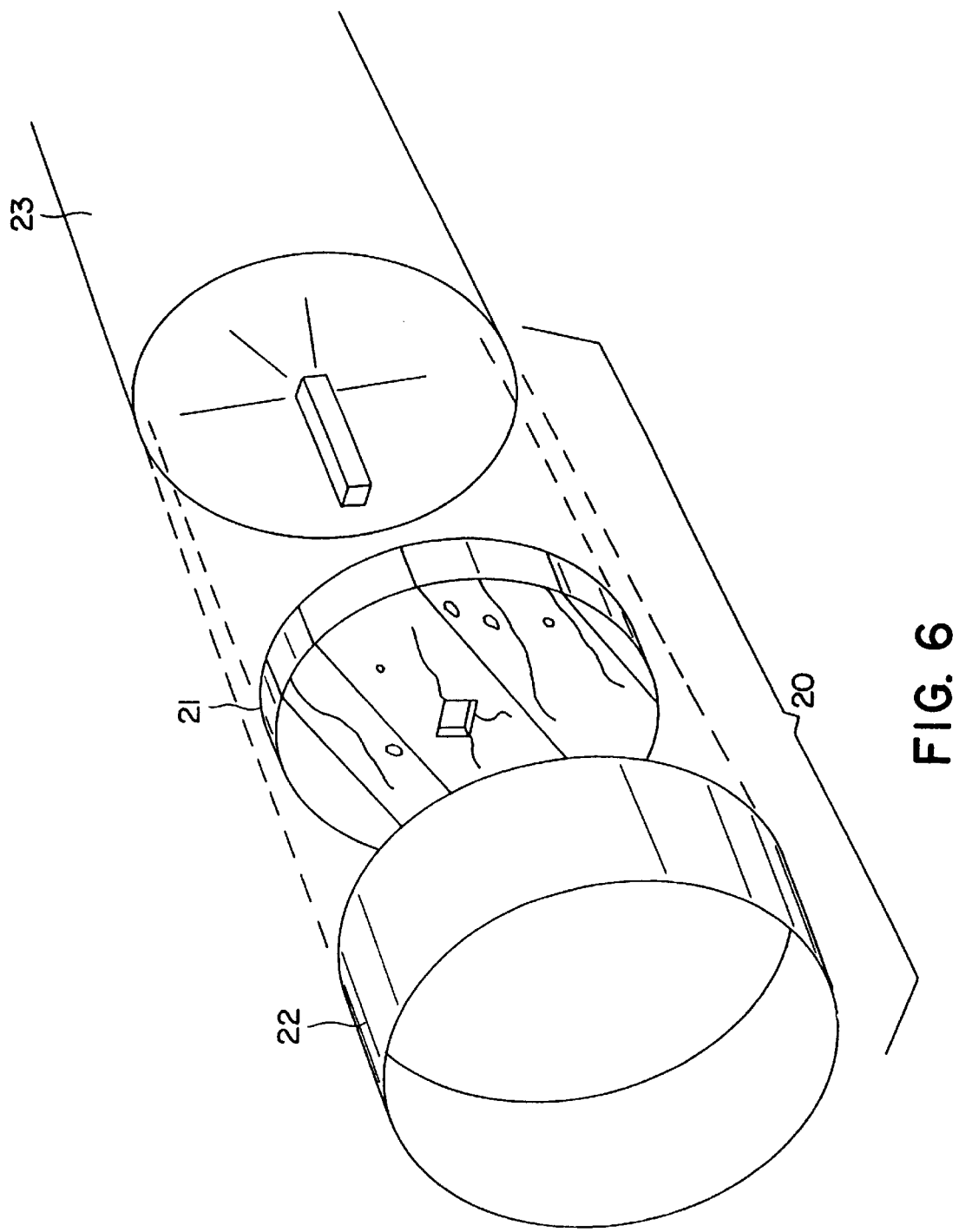
FIG. 6 is an exploded perspective view of a metal roll core base and an extender assembly used to assist in the manufacturing of rolls in accordance with the present invention.

In the embodiments of the present invention employing a three dimensional spacer fabric as an intermediate compressive layer, the fabric is laid over a suitable roll base with an adhesive cement. After curing, the surface of the spacer fabric layer is covered with a resin and baked to form an intermediate compressive layer. Following the curing of this resin coated surface surrounding the intermediate compressive layer, the cover layer is applied. FIG. 4 illustrates, generally, how the cover can be applied from a roll of resin impregnated textile on to the rotating roll. Another way of covering the roll is to cast the cover as shown in FIG. 5. wherein a metal mold 20 is fitted over the roll after applying the intermediate layer 12. Then, the cover is cured allowing the resulting chemical and temperature changes to shrink the cover over the three dimensional spacer fabric layer. To facilitate the filling of the compressive layer, FIG. 6 shows how an extender cap assembly 20 is placed on each end of the metal roll core base. The extender cap assembly comprises a substantially circular plate 21 and a cylindrical section 22. referably, the plate 21 is made out of wood and the cylindrical section is made of the same material as the roll core base 23. However, other suitable extender cap assemblies can be made entirely out of wood or other similar materials, and may include other configurations, such as, annular rings, annular rings with a bolt-on top plate or other cap shapes, including shoulder plates integral with the ring, and equivalents thereof.

Figure 7:
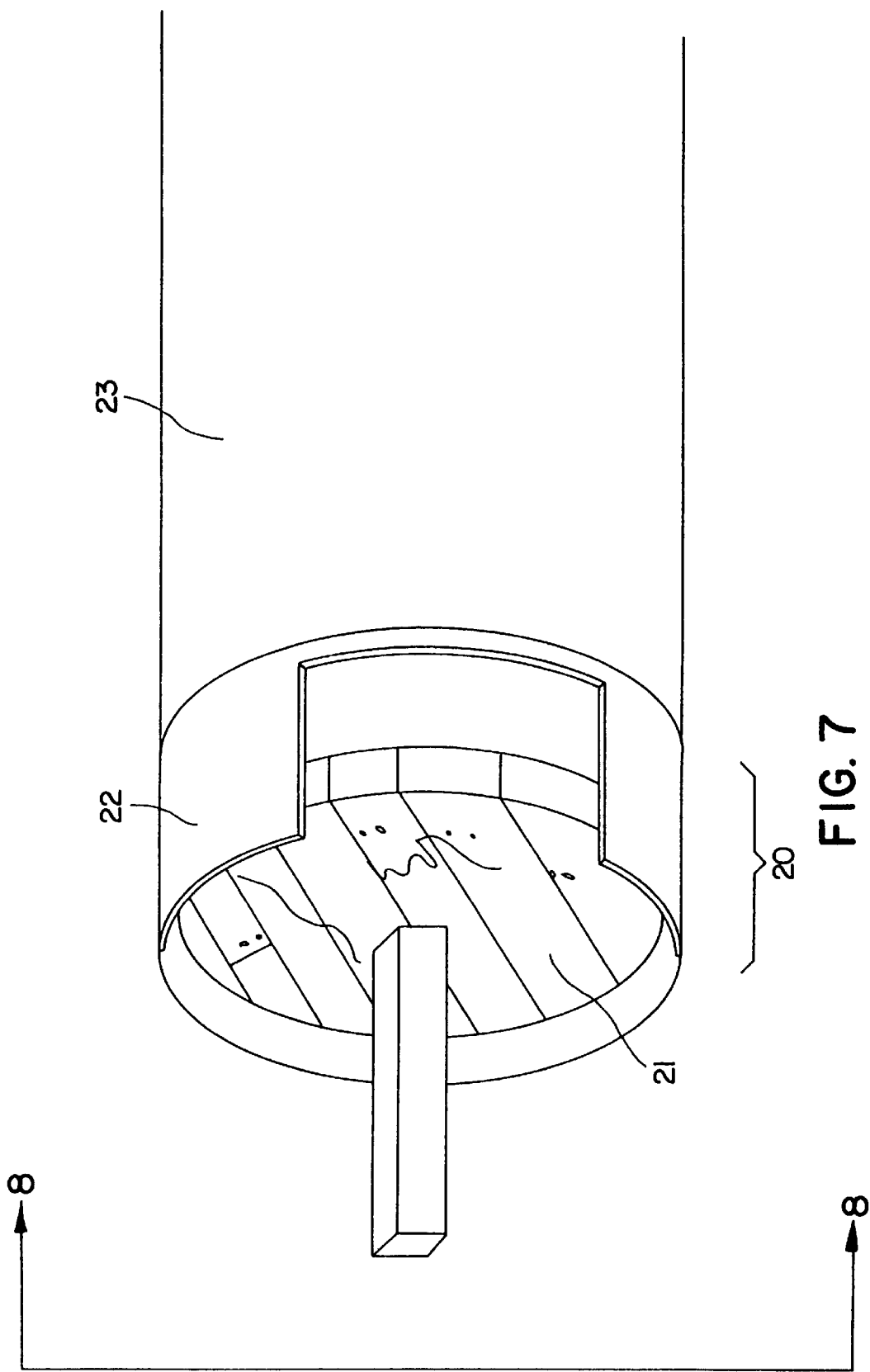
FIG. 7 is a perspective view of an extender assembly as it is fitted flush with the surface of a metal roll core base in accordance with the present invention.

FIG. 7 is a perspective and cut-away view of the extender can assembly 20 in place on one end of the metal roll core base 23 prior to the application of any layers, and shows how the outer circumference of the cylindrical section 22 matches the circumference of the metal roll core base 23.

Figure 8:
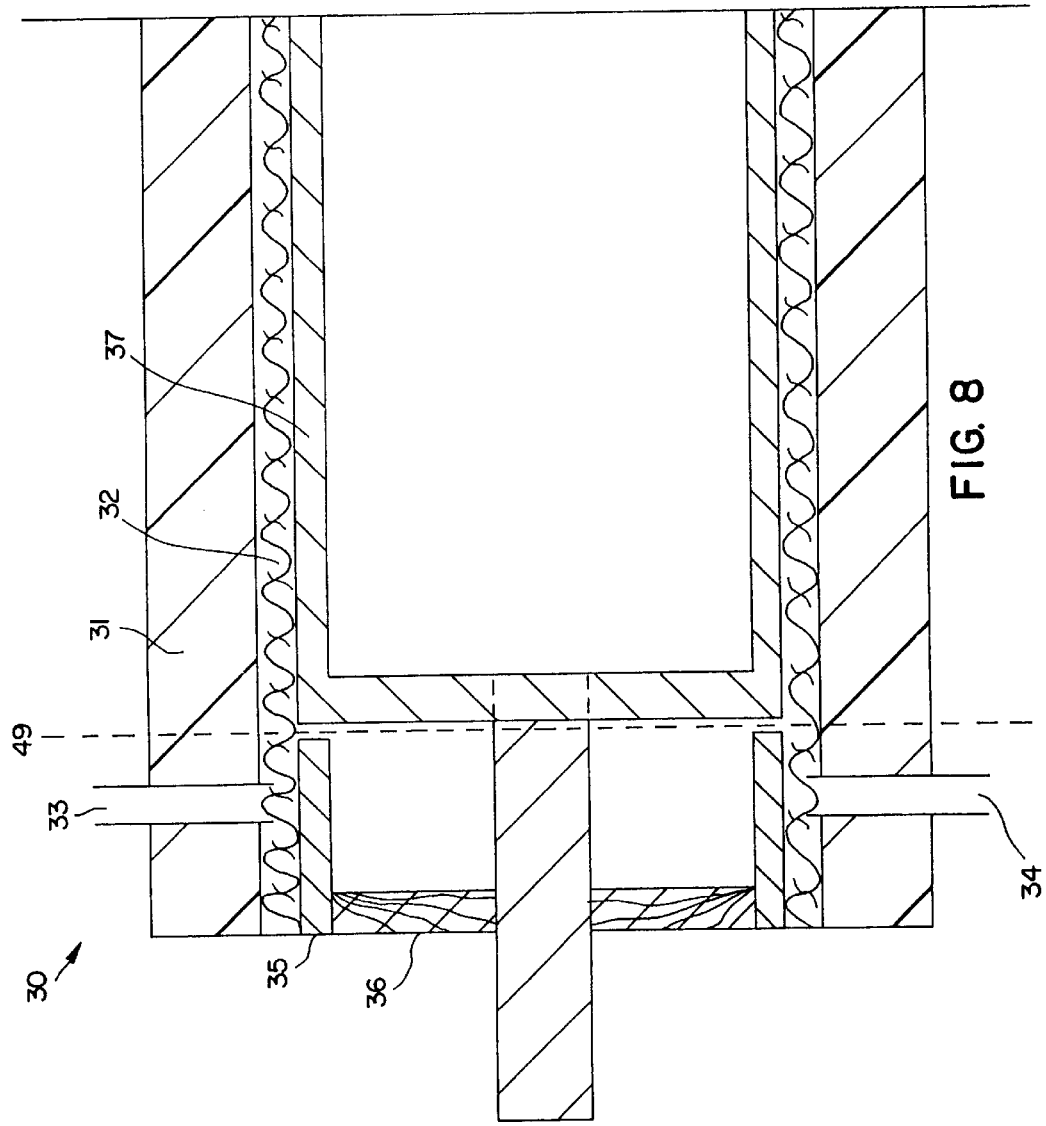
FIG. 8 is a sectional view taken along line 8—8 of FIG. 7 of the covered roll of the present invention further showing the bottom drill sites as they are located within the region defined by the surface of the covered extender assembly.
Figure 9:
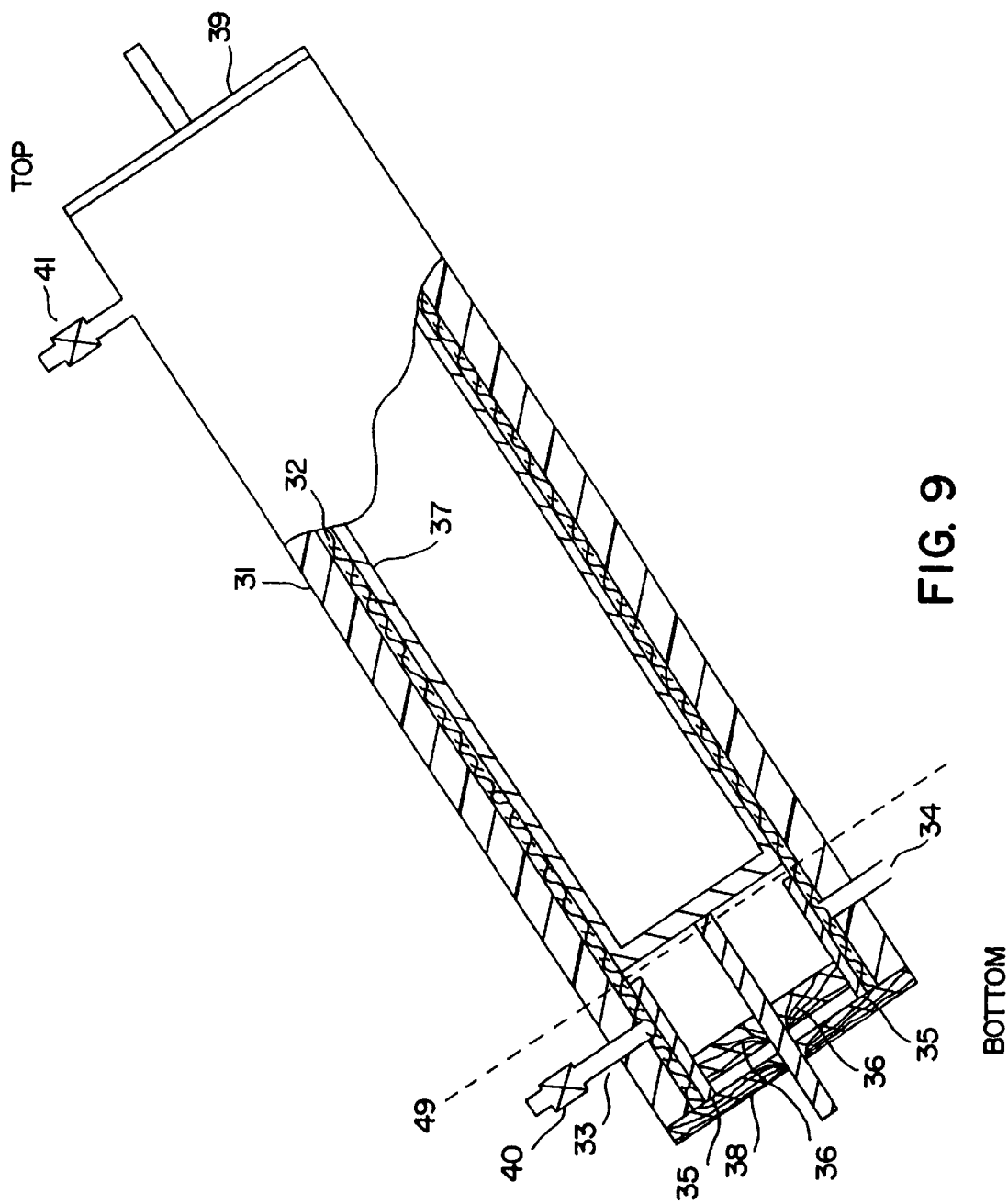
FIG. 9 is a partially sectioned view of an elevated roll manufactured in accordance with the present invention.

After the cover 11 is applied and cured, drill holes can be made in the region of the extender caps. FIG. 8, shows a sectional view of the covered roll 30 of the present invention prior to the injection of filling material into the intermediate compressive layer 32. The drill holes 33 and 34 extend through the cover 31 and into the intermediate compressive layer material 32, and are to be used as a conduit for filling the intermediate layer 32. Phantom lines 49 in FIG. 8 and FIG. 9, further show how the drill holes are located within the region of the covered extender cap assembly comprising the annular ring 36 and cylindrical section 35. As a final step of the process, the now compressed intermediate layer is filled with a system for forming a thermoset polymer. FIG. 9 shows how this is accomplished by lifting the roll on its bottom end so that it tilts or sits at an angle in the range of about 5–90° with respect to the horizontal. Then, the thermoset resin forming system can be pumped under pressure into the intermediate compressive layer until the resin flows out of the top taps or spigots. With reference to FIG. 8, this is accomplished by placing gaskets 38 and 39 over each end of the roll. Preferably, the gasket is made out of wood similar to plate 21 described herein. The thermoset resin forming system is pumped into through hole 34 until the thermoset resin forming system extrudes out of valve 40 located at through hole 33. Then, the valve 40 is closed and the thermoset resin forming system continues to be pumped into through hole 34 until it extrudes out of valve 41 located at the top of the roll. At this point, the intermediate compressive layer is completely filled. All that remains to complete the roll is the cutting of the extender portions of the roll.

After injecting the filling material into the intermediate compressive layer 31 and curing the filler material, the covered extender cap assembly can be removed from the remainder of the roll, for example, by cutting towards the metal roll core base 37 in the vicinity of phantom lines 49 indicated in FIG. 8. Thus, the finished product is a covered roll absent any drill holes. Manufacturing a covered roll with the aforementioned extender cap assemblies also serves the purpose of ensuring that the intermediate layer of the finished roll is completely filled with material.

Figure 10:
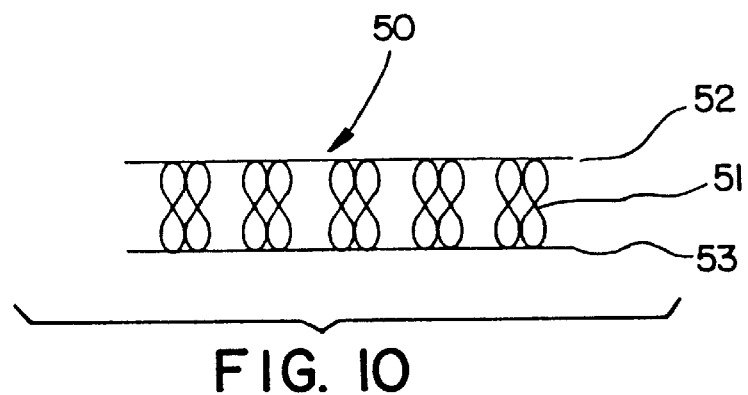
FIG. 10 is a side view of a three dimensional compressive spacer fabric that may be employed in producing the present invention.

FIG. 10 shows how the compressive layer may be, for example, a three dimensional spacer fabric layer 50 having structurally supporting fibers 51 interwoven between a top fibrous layer 52 and bottom fibrous layer 53. Examples of other suitable three dimensional fabrics are described in U.S. Pat. No. 5,052,448 issued to W. Givens the teachings and disclosure of which are hereby incorporated by reference.

Figure 11:
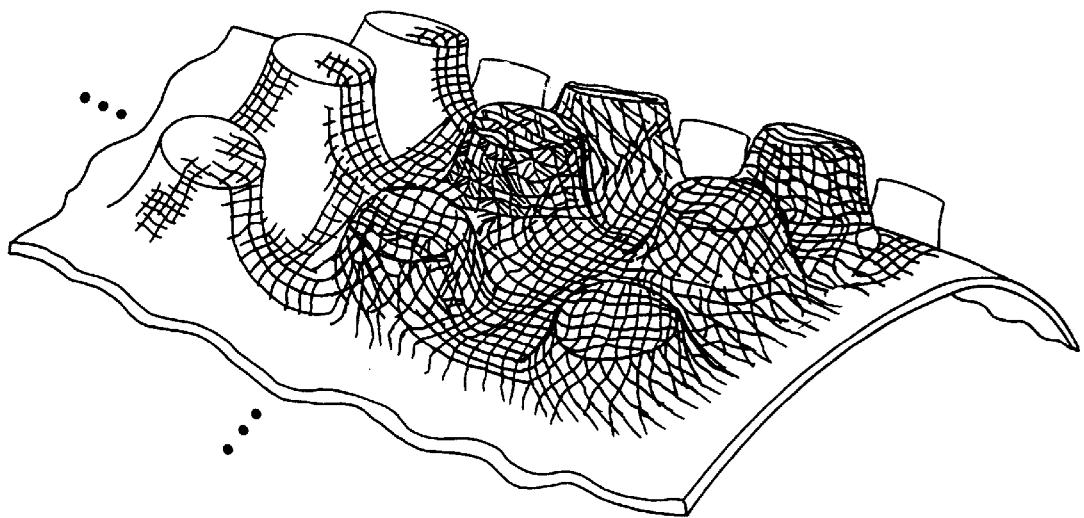
FIG. 11 is a perspective view of a sheet having a plurality of projections which define a plane in space; and, FIG. 12 is a quarter section of a finished covered roll manufactured in accordance with the present invention which shows a covered roll having a cover with a beveled edge and an intermediate spacer fabric layer filled with a resin.

FIG. 11 shows another example of a suitable intermediate compressive layer is a three dimensional sheet having a single surface and a plurality of projections, wherein the projections extend from the surface to define a substantially planar boundary. As will be apparent to one skilled in the art, the sheet may have a variety of projections including semi-conical, conical, hemispherical and the like. Further, the pattern or two dimensional layout of these projections may vary to include substantially checkerboard patterns, triangular patterns and other configurations depending upon the method of roll making.

As will be apparent to one skilled in the art, more than one compressive layer may be used if the roll design so dictates. The compressive layer is preferably formed from a fabric although other materials are suitable. It is readily apparent to one skilled in the art that different kinds of three dimensional spacer materials may be used as a compressive layer including but not limited to: three dimensional spacer textile fabrics; textile fabrics impregnated with resins; three dimensional sheets made out of fiberglass, polyester, vinylester or epoxy; and, combinations and equivalents thereof. Typically, it is desirable to use a material for the compressive layer that is flexible enough so as to be rolled; resilient enough so as to be compressed; rigid enough to support a cover; and/or, porous enough so that it can be filled with a suitable material.

It should be noted that the compressive layer has a noticeable thickness usually in the order of 2 to 15 millimeters with 4 mm being preferred, and should not be confused with woven or nonwoven sheet materials that may be applied during the manufacturing of covered rolls as one or more layers. It is important that the compressive layer be fillable with a material that will form a composite part of the roll and be compatible with the cover material. As is explained in detail below the filling material is usually a resin system similar to the resin system used to form the cover, but which cures at a lower temperature than the cover. An important aspect of the present invention is that the compressive layer remain unfilled with any resin forming material until after the cover material of the covered roll has been fully cured.

When the compressive layer is formed from a fabric, the fabric is composed of a suitable material, preferably a synthetic material, such as a polyester, DACRON, or other synthetic material, such as NYLON. The preferred fabric is a "Textile Spacing Fabric" that can be purchased from Müller Textil GmbH, Postfach 31 40 D-5276 Wiehl-Drabenderhöhe, Germany, the details of which are provided in a brochure displaying product number 5556 incorporated herein by reference. Other spacer fabric materials suitable for use include 3D-TEX, by MAYSER GMBH & CO., Lindenberg, Postfach 1362, Germany, and a fiberglass product by PARABEAM Industries, Hoogeindsestraat 49, 5700 AC Helmond, Netherlands.

Rolls in accordance with the present invention can utilize two systems which yield two different polymers upon curing. The polymer forming the cover, is preferably a thermoset resin and can be any polymer normally used in the art, and forms no part of this invention. Most commonly an epoxy resin is used for the cover, such as, an epoxy resin based on a Diglycidylether of Bisphenol A, commercially known as DER 331 from Dow Chemical Co. This would be cured in a temperature range from 130–150° with an aromatic amine, such as, Diethylenetoulenediamine (DETDA 80) from Lonza Ag, Switzerland. As another example, the cover can be made from a Cyanate Ester modified Novolac Resin system supplied from Allied Signal Inc., U.S.A.

Preferably, the intermediate layer is filled with a thermoset forming system that cures at a lower temperature than the polymer system used for the cover. The intermediate layer can be filled with a resin. Although, the filler material for the intermediate layer is preferably a thermoset resin, a thermoplastic material can be employed. As with the cover, the preferred epoxy resin is based on a Diglycidylether of Bisphenol A, commercially known as DER 331 from Dow Chemical Co., but cured in the temperature range of 70–90° C. with a suitable aliphatic amine, such as, Jeffamine T-403 supplied by Texaco Chemical Co., U.S.A.

In an exemplary embodiment, the spacer fabric layer is filled with a thermoset polymer under such conditions, in which the development of higher than desired residual stresses in the cover and also in the spacer fabric layer itself, can be prevented. As an additional aid in reducing residual stresses, such thermoset systems may be utilized for the compressive layer, which have properly designed combined thermal and cure shrinking properties. For base systems which require high temperature resistance, tailored thermoset systems may be used in a way that the glass transition temperature in the base can be adjusted to the required level.

The invention is further illustrated by the following non-limited example.

Although the present invention is applicable to originally manufactured rolls which have never been covered, (OEM), for use in mills, the present example is directed to a calender roll which has been removed from a paper mill for purposes of being recovered with a hard, polymeric surface. Initially, after the roll is received in the plant, the old covering is removed by placing the roll in the lathe and removing the worn, damaged covering with a cutting tool. In one of many standard procedures for refurbishing such rolls, the cutting tool is allowed to scrap away the prior covering allowing a fraction of a millimeter of the prior covering to remain on the steel roll core. Thereafter, the remaining fraction of a millimeter of covering is removed by grinding. The roll cores normally are made of steel but commonly they are formed of cast iron and chilled iron.

After the grinding operation the roll core is grit blasted. Grit blasting produces an activated surface on the metal core to optimize bonding with subsequent non-metallic materials that are to be built up on the roll core during the recovering operations.

After a grit blasted activated surface has been achieved, a protective layer, such as a phenolic resin or other suitable protective layer known in the art, is applied to the surface of the roll core to prevent oxidation that would otherwise reduce the optimal bonding of the prepared surface.

The foregoing pretreatment steps are standard and have been used in the roll covering industry for decades and form no part of the present invention.

In this example, prior to the application of the compressive layer, a base layer is applied to the metal roll that has been pretreated as set forth above. The base layer is applied by a wrapping technique using the method and apparatus shown in FIG. 4. In this embodiment a 100 mm wide fiberglass fabric is wrapped with 50% overlap on to the roll while the roll is rotating. The roll is simultaneously sprayed with a two component epoxy resin system based on a Diglycidylether of Bisphenol A, commercially known as DER 331 from Dow Chemical Co., and is cured with an aromatic amine curing agent, Diethylenetoulenediamine (DETDA 80) from Lonza Ag, Switzerland. The wrapping is continued for eight passes, a single pass extending the length of the roll, so as comprise 8 plies and produce a base layer 3 mm thick. This layer is then gelled as the roll is subjected to a curing temperature of 50° C. from heat lamps for a period of about 5 hours.

The next step in the process is to prepare the surface for bonding. This is done by rough grinding the gelled base and then applying an adhesive to the resulting roughened surface. An epoxy based adhesive is applied to the ground surface and then the spacer fabric is applied over that.

The preferred spacer fabric is a "Textile Spacing Fabric" that can be purchased from MUller Textil GmbH, Postfach 31 40 D-5276 Wiehl-Drabenderhöhe, Germany, the details of which are provided in a brochure displaying product number 5556 incorporated herein by reference. As shown in FIG. 10, this fabric can be thought of as a sandwich formed from a top and bottom woven surface with a filler weaved in between. This fabric is preferred because it is very compressible under pressure and yet rigid enough to be wrapped in subsequent steps. For this example, a 4 mm thick material is purchased in widths of 1.5 meters so that 4 pieces are needed to cover a 6 meter roll. After the textile spacing fabric has been sewn and secured to the roll base, it is coated with a 1 mm sealing layer whose purpose is to prevent impregnation of subsequent resin material into the hollow cavities of the spacing fabric. To accomplish this, a non-woven tape impregnated with resin is wrapped around the textile spacing fabric while the roll is rotated on a lathe. The non-woven tape that is used is called Reemay and is obtained from Nordlys SA, Z1 de la Blanche, Maison 59270, Bailleul, France. It is a fabric made from fibers of polyester. Prior to being applied to the roll it is run through a dipping trough of epoxy resin. Again, the epoxy resin is based on a Diglycidylether of Bisphenol A, commercially known as DER 331 from Dow Chemical Co., but cured with an aliphatic amine, Jeffamine T-403 supplied by Texaco Chemical Co. The two part components that are necessary to produce the cured resin are fed into the dipping tank which also contains the aliphatic amine curing agent. After the roll has been wrapped in 2 passes with the thermoset resin impregnated non-woven material, the resin in the material is gelled at a temperature of 50° C. for 2 hours, but not cured.

At this stage the adhesive film prevents the liquid from the next step from penetrating through it and into the textile spacing fabric while at the same time being compressible enough to allow the shrinking of the next layer to be absorbed by the spacing fabric.

The next step in the procedure is application of the cover material, and in this example, it is applied by the wrapping procedure shown in FIG. 4. In this step, however, another non-woven material formed of Kevlar is utilized. Kevlar, a product of Dupont, is obtained from Technical Fibre Products, Limited, Burnesside Mills, Kendall, Cumbria LA9 6PZ England. The non-woven fabric used has a specification of 25 g/m$^2$. Here, again, the epoxy resin is based on a Diglycidylether of Bisphenol A, and is the same epoxy used to form the protective gel coat but with the aromatic amine curing agent used to form the base layer, Diethylenetoulene-diamine (DETDA 80) from Lonza Ag, Switzerland.

The cover material is wrapped in this manner. Using 100 mm wide strips, the wrapping process is extruded for 20 passes in a 50:50 overlap to achieve a specified thickness which in this case is 7 mm. The next step in the process is to gel the top layer so that it is non-flowing. This is done by heating the roll under infrared lamps while the roll rotates for 15 hours at 70° C. After it is gelled the ends of the coating are cut to provide an even coating, (trimmed). The trimming is done right down to the metal core. This is done with a cutting tool. The entire roll is the delivered to an oven. It is cured under the following curing cycle: 8 hours at 80° C., followed by 8 hours at 90° C., followed by 8 hours at 100° C., and finally, followed by 16 hours at 110° C. The roll is then delivered to another oven for its cool down cycle. It is allowed to cool for 10 hours. The roll is then taken to the production floor where the surface is prepared, normally by grinding it to a nearly smooth, but unfinished surface.

The roll is then taken to the production floor where the surface is prepared, normally by grinding it to a nearly smooth, but unfinished surface. Prior to finishing the surface of the cover layer, the roll is prepared for the filling of the intermediate compressive layer by drilling holes through the cover into the interior of the textile spacing fabric. Preferably, this is accomplished by drilling 3 holes into the ends of the roll at the locations shown in FIG. 9, (base and sealing layers not shown). The resin is inserted into the cavity of the intermediate spacer fabric layer through the bottom hole 34 until it squirts out the bottom hole 33 on the opposite side through valve 40. When this occurs, valve 40 is closed and the cavity is filled with resin until it flows out of valve 41. Again, it is the same resin system that is used for sealing the top layer for the spacing fabric, i.e., Bisphenol A epoxy resin with an aliphatic amine curing agent.

Prior to the insertion of the resin, the entire roll assembly is preheated in an oven to a temperature of 75° C. The entire roll is then cured in an oven at 75° C. for 24 hours.

During the entire processing of this roll an extender 35 can has been placed over both ends of the roll. Each extender can has an annular ring 36 that slips over the axial of the roll mating and extending the metal cylindrical surface outward along its longitudinal axis. Cylindrical cans are placed on both ends of the axle. Ideally this is done by having a wooden donut 36 where the donut fits over the axle of the roll and then this provides the edge of the can which extends the roll covering surface. It is important to note that the roll core metal base 37 and the extender cans 35 are treated with the covering processes herein described. Thus, the roll core metal base and its extender cans are covered with the base layer, the intermediate spacer fabric layer, the sealing layer and the cover at the end of the process. The use of the extender cans creates an additional void to be filled during the step of filling the intermediate layer, thus guaranteeing the complete filling of the intermediate layer. Furthermore, since the holes are drilled in the region of the extender cans, the covering can be cut interior to the boundary of the holes thereby presenting a finished product.

The next part of this example is to cut through the various layers to the actual metal roll followed by the removal of the two end pieces. The cutting is done interior to the location of the holes to produce a roll with a finished covering. As final steps in the process, the cover is finish ground and the edges can be treated to form a slight bevel which is currently known in the art. In accordance with the above example, FIG. 12 shows a covered roll 1 having a cover 2 with a beveled edge and a filled intermediate spacer fabric layer 4, (base and sealing layers not shown). All of the layers have been cut down to the metal roll core 5. The extender can assembly, (not shown), has been removed.

Using the method of the foregoing specific example, high performance covered rolls can be produced in a range of cover, intermediate layer and base layer thicknesses. Specifically, the base layer and its associated manufacturing steps can be omitted entirely by cementing the intermediate spacer fabric directly to a metal roll core base. However, when a polymeric base is employed, it can range in thickness to about 8 mm. The intermediate layer and its sealer layer can also vary in depth in the range of about 2–15 mm. Similarly, the cover thickness can vary in a range of about 4–20 mm. Although these parameters may vary as indicated, the above described procedures for making a specific roll remain substantially unchanged.

In the foregoing specification, the invention has been described with reference to specific exemplary embodiments thereof. It will, however, be evident that various modifications and changes may be made thereunto without departing from the spirit and scope of the invention as set forth in the appended claims. The drawing and specification are, accordingly, to be regarded in an illustrative rather than in a restrictive sense.

We claim:

1. A covered roll comprising:

a roll core base;

a compressive layer having a top surface and a bottom surface and a void space therebetween, said compressive layer circumferentially surrounding said roll core base;

a cover circumferentially surrounding said compressive layer, said cover being formed of a material which is cured at a temperature greater than 100° C.;

said compressive layer being rigid enough to support said surrounding cover and compressible enough to change in volume in response to the volume changes which occur in said cover as a result of the stresses created during processing.

2. The covered roll of claim 1, wherein said cover comprises an epoxy resin having a Shore-D hardness greater than 84.

3. The covered roll of claim 2, wherein said cover is an epoxy resin which is cured at a temperature greater than 100° C.

4. The covered roll of claim 2, wherein the void space of said compressive layer is filled with an epoxy resin cured at a temperature lower than a temperature for which the cover is cured.

5. The covered roll of claim 1, wherein said compressive layer comprises a fabric having a fibrous top surface and a fibrous bottom surface, said top and bottom surfaces being structurally supported by fibers extending from said top surface to said bottom surface.

6. The covered roll of claim 1, wherein said compressive layer comprises a sheet having a single surface and a plurality of projections, said projections extending from said surface to define a substantially planar boundary.

7. The covered roll of claim 1, wherein the roll core base comprises a metal roll core.

8. The covered roll of claim 3, wherein the roll core base comprises a metal roll core.

9. The covered roll of claim 3, wherein the void space of said compressive layer is filled with an epoxy resin cured at a temperature lower than a temperature for which the cover is cured.

10. The covered roll of claim 5, wherein the void space of said compressive layer is filled with an epoxy resin cured at a temperature lower than a temperature for which the cover is cured.

11. The covered roll of claim 6, wherein the void space of said compressive layer is filled with an epoxy resin cured at a temperature lower than a temperature for which the cover is cured.

12. A method of making a covered roll comprising the steps of:

predetermining the amount of shrinkage that will occur during production of said roll;

applying a compressive layer over a mandrel base, said compressive layer having a sufficient depth to absorb the volume changes from subsequent layers allow for shrinkage;

applying a coating material to said compressive layer to form a cylinder;

heat treating the cylinder to cure the cylinder material into a solid cover, said compressive layer being allowed to change in volume as a result of the stresses created during processing;

removing the mandrel so as to create a tube;

applying said tube over a roll core base;

and, filling the gap between said roll core base and said tube to create a solid roll.

13. A process for making a cylindrical tube for later use as a roll cover, said process comprising:

predetermining the amount of shrinkage that will occur during production of said roll;

applying a compressive layer over a mandrel base, said compressive layer having a sufficient depth to absorb the volume changes from subsequent layers allow for shrinkage;

applying a coating material to said compressive layer to form a cylinder;

heat treating the cylinder to cure the cylinder material into a solid cover, said compressive layer being allowed to change in volume as a result of the stresses created during processing;

and, removing the mandrel so as to create a tube.

14. A covered roll comprising:

a roll core base;

a compressive layer circumferentially surrounding said roll core base, said compressive layer comprising a removable material that is removable by melting;

a covering material circumferentially surrounding said compressive layer;

said compressive layer also being compressible enough to change in volume as a result of the stresses created during processing, and rigid enough to support the cover material.

15. The method of claim 12, wherein said coating material comprises an epoxy resin.

16. The method of claim 12, wherein filling step comprises filling the gap between said roll core base and said tube with a polymeric material.

17. The process of claim 13, wherein said coating material comprises an epoxy resin.

18. The covered roll of claim 14, wherein said covering material comprises an epoxy resin.

* * * * *